US012264531B2

(12) United States Patent
Folie et al.

(10) Patent No.: US 12,264,531 B2
(45) Date of Patent: Apr. 1, 2025

(54) DRIVE DEVICE FOR A MOVABLE FURNITURE PART

(71) Applicant: Julius Blum GmbH, Hoechst (AT)

(72) Inventors: Andreas Folie, Dornbirn (AT); Martin Huber, Lindau (DE); Klaus Kroess, Dornbirn (AT); Juan Jesus Pedrosa Fernandez, Dornbirn (AT)

(73) Assignee: JULIUS BLUM GMBH, Hoechst (AT)

( * ) Notice: Subject to any disclaimer, the term of this patent is extended or adjusted under 35 U.S.C. 154(b) by 43 days.

(21) Appl. No.: 18/136,071

(22) Filed: Apr. 18, 2023

(65) Prior Publication Data

US 2023/0313587 A1 Oct. 5, 2023

Related U.S. Application Data

(63) Continuation of application No. PCT/AT2021/060381, filed on Oct. 15, 2021.

(30) Foreign Application Priority Data

Oct. 22, 2020 (AT) .............................. A 50908/2020

(51) Int. Cl.
*E05F 1/08* (2006.01)
*E05F 1/10* (2006.01)
*E05F 5/02* (2006.01)

(52) U.S. Cl.
CPC ................ *E05F 5/02* (2013.01); *E05F 1/105* (2013.01); *E05Y 2201/212* (2013.01); *E05Y 2900/20* (2013.01)

(58) Field of Classification Search
CPC ..... E05F 1/1276; E05F 1/1246; E05F 1/1253; E05F 1/1261; E05F 1/1058; E05F 1/1075;
(Continued)

(56) References Cited

U.S. PATENT DOCUMENTS 7,478,891 B2 1/2009 Hollenstein
7,500,287 B2 * 3/2009 Brustle .................... E05F 5/02 16/289

(Continued)

FOREIGN PATENT DOCUMENTS

AT 007 500 4/2005
DE 20 2014 102 481 10/2015

(Continued)

OTHER PUBLICATIONS

International Search Report issued Jan. 20, 2022 in International (PCT) Application No. PCT/AT2021/060381.

*Primary Examiner* — Chuck Y Mah
(74) *Attorney, Agent, or Firm* — Wenderoth, Lind & Ponack, L.L.P.

(57) ABSTRACT

A drive device for a movable furniture part including a support to be fastened to a furniture carcass, an actuation arm device mounted movably on the support and to be connected to the movable furniture part, an energy store for applying force to the actuation arm device, a damping device for damping a closing and opening movement of the actuation arm device, and an adjusting device for adjusting a force of the damping device, a damping start position in relation to an angle position of the actuation arm device, and/or in terms of a damping travel. The adjusting device includes an adjusting element coupled to the damping device such that an adjustment of the damping force, damping start position, and/or damping travel takes effect when the actuation arm device is damped during the closing movement, and when the actuation arm device is damped during the opening movement.

20 Claims, 14 Drawing Sheets

(58) Field of Classification Search

CPC ..... E05F 1/14; E05F 1/105; E05F 1/12; E05F 1/1223; E05F 3/20; E05F 5/02; E05F 5/027; E05F 5/06; E05F 5/10; E05D 3/06; E05D 3/12; E05D 3/16; E05D 3/18; E05D 1/00; E05D 1/06; E05D 5/0215; E05D 5/023; E05D 5/0238; E05D 5/0276; E05D 11/0054; E05D 11/00; E05D 11/11; E05Y 2201/21; E05Y 2201/212; E05Y 2201/264; E05Y 2201/47; E05Y 2201/492; E05Y 2201/618; E05Y 2900/20; E05Y 2900/202; A47B 2220/0072

See application file for complete search history.

(56) References Cited

U.S. PATENT DOCUMENTS

| | | | |
|---|---|---|---|
| 7,971,691 B2 | 7/2011 | Holzapfel | |
| 8,321,996 B2 * | 12/2012 | Hirtsiefer | E05F 5/02 16/354 |
| 8,807,670 B2 | 8/2014 | Blum | |
| 9,277,817 B2 | 3/2016 | Blum | |
| 10,294,705 B2 | 5/2019 | Hirtsiefer et al. | |
| 10,407,962 B2 | 9/2019 | Schulge | |
| 10,428,568 B2 | 10/2019 | Brunnmayr | |
| 10,494,846 B2 * | 12/2019 | Schmid | E05D 3/16 |
| 10,494,850 B2 * | 12/2019 | Liang | E05D 11/1021 |
| 10,876,336 B2 * | 12/2020 | Kruedener | E05D 5/02 |
| 10,900,269 B2 | 1/2021 | Holzapfel et al. | |
| 11,598,136 B2 * | 3/2023 | Guzeltepe et al. | E05F 3/20 |
| 11,603,687 B2 * | 3/2023 | Giovannetti | E05F 5/02 |
| 11,719,032 B2 * | 8/2023 | Zhi | E05F 1/105 16/72 |
| 2003/0229965 A1 * | 12/2003 | Wang | E05D 3/142 16/54 |
| 2006/0220284 A1 | 10/2006 | Holzapfel | |
| 2006/0284530 A1 | 12/2006 | Hollenstein | |
| 2011/0083299 A1 | 4/2011 | Krüdener | |
| 2012/0161598 A1 | 6/2012 | Blum | |
| 2013/0031746 A1 * | 2/2013 | Hasegawa | E05F 5/027 16/50 |
| 2014/0319987 A1 | 10/2014 | Blum | |
| 2016/0024829 A1 * | 1/2016 | Lowe | E05F 5/08 16/85 |
| 2016/0333620 A1 * | 11/2016 | Holzapfel | E05F 1/1058 |
| 2017/0044812 A1 | 2/2017 | Schluge | |
| 2017/0292307 A1 | 10/2017 | Hirtsiefer et al. | |
| 2018/0291665 A1 * | 10/2018 | Güzeltepe | E05D 15/401 |
| 2018/0363346 A1 | 12/2018 | Holzapfel et al. | |
| 2019/0003229 A1 | 1/2019 | Brunnmayr | |
| 2020/0123831 A1 * | 4/2020 | Xu | E05F 5/08 |
| 2020/0224477 A1 * | 7/2020 | Sobolewski | E05F 1/1075 |
| 2022/0018174 A1 | 1/2022 | Güzeltepe et al. | |
| 2022/0018176 A1 * | 1/2022 | Guzeltepe et al. | E05F 3/18 |
| 2022/0307309 A1 * | 9/2022 | Hirtsiefer | E05F 1/105 |

FOREIGN PATENT DOCUMENTS

| | | |
|---|---|---|
| DE | 10 2014 113 967 | 3/2016 |
| EP | 1 707 723 | 10/2006 |
| EP | 2 607 592 | 6/2013 |
| JP | 2017-515018 | 6/2017 |
| JP | 2017-532469 | 11/2017 |
| JP | 2019-511651 | 4/2019 |
| JP | 2019-511653 | 4/2019 |
| WO | 2009/127335 | 10/2009 |
| WO | 2011/020130 | 2/2011 |
| WO | 2012/155165 | 11/2012 |
| WO | 2015/164894 | 11/2015 |
| WO | 2017/152212 | 9/2017 |
| WO | 2020/112058 | 6/2020 |

* cited by examiner

A

B (2 : 1)

DRIVE DEVICE FOR A MOVABLE FURNITURE PART

BACKGROUND OF THE INVENTION

The present invention relates to a drive device for a movable furniture part, in particular for a furniture flap, with a support which can be fastened to a furniture carcass, an actuating arm device which is mounted movably on the support and can be connected to the movable furniture part, an energy storage mechanism with which a force can be applied to the actuating arm device, a damping device with which a closing movement and an opening movement of the actuating arm device can be damped, and an adjustment device with which the damping device can be adjusted in terms of a damping force, in terms of a damping start position in relation to an angle position of the actuating arm device relative to the support, and/or with respect to a damping stroke. In addition, the invention relates to a piece of furniture with such a drive device.

Drive devices with actuating arm devices are used above all in the case of furniture flaps which are pivotable upwards about a horizontal axis for opening. General examples of this follow from WO 2012/155165 A2 and WO 2011/020130 A1. A damping device which damps the movement of the furniture flap moving in the closing direction is also described in the second document.

A furniture fitting with a damping device which damps a closing movement of the furniture flap also follows from EP 2 607 592 A2. In it, the damper has an impact surface, wherein the impact surface, in the absence of an application element, is in a damping start position. The damper is assigned adjustment means for adjusting the damping start position. This start position can thus be adjusted with this furniture fitting, but this furniture fitting is not suitable for damping an opening movement of the furniture flap.

In contrast, EP 1 707 723 A2 shows an actuating arm drive for flaps, wherein a damper generates a damping effect before the upper end position is reached and before the lower end position is reached. During closing a limit stop arranged on the actuating arm presses on the first end of the damper, while a linearly movable carriage presses on a second end of the damper at the end of the opening stroke. The damping stroke and the damping power of the damper are adjustable.

WO 2020/112058 A2 also shows a furniture fitting for a furniture flap, with which the end portions of the closing movement and of the opening movement can be damped. In that document, however, damping devices separate from each other and arranged at different locations are provided for the respective damping movement.

SUMMARY OF THE INVENTION

The object of the present invention is to create an alternative or improved drive device. In particular, the disadvantages existing in the state of the art are to be avoided at least in part. The drive device is to be as compact, simple and at the same time as versatile as possible.

Thus, the adjustment device comprises at least one adjustment means which is coupled to the damping device in such a way that an adjustment of the damping force, of the damping start position and/or of the damping stroke carried out by the adjustment device takes effect by means of the damping device both in the case of a damping of the actuating arm device effected in the course of the closing movement and in the case of a damping of the actuating arm device effected in the course of the opening movement.

According to a variant the damping stroke can be lengthened or shortened with the adjustment device. This means that this adjustment can be effected directly in the damping device.

Alternatively, the damping force of the damping device can be correspondingly altered and adapted to the weight of the furniture flap to be moved.

Alternatively—and particularly preferably—the damping start position is adjustable, and thus alterable, with the adjustment device. Specifically, this means that a changed angle position of the furniture flap at the start of the damping movement is also provided by the change in the damping start position. The damping start can thus be effected in a different or changed angle position of the furniture flap.

In a particularly simple and uncomplicated embodiment, the damping device can be impinged on by the actuating arm device from the same side both during an opening movement and during a closing movement. Thus, no complicated movement rerouting is necessary in order to impinge on the damping device "from behind" as it were.

The damping device can be formed as a spring or as another elastic damping element. However, preferably the damping device is formed as a fluid damper.

According to a particularly preferred embodiment, the damping device has a damper housing, a damper piston movable relative to the damper housing, and a damping agent, preferably a damping fluid arranged in a fluid chamber, for damping a relative movement between damper housing and damper piston.

Furthermore, preferably the actuating arm device rests against the damper piston during a furniture-part damping movement. The time or position at or in which the actuating arm device contacts the damper piston or rests against it or begins to impinge on it is the damping start position.

The damper housing can be stationary relative to the support during a furniture-part damping movement. Thus, only the damping piston moves relative to the support (fixed on the furniture carcass) during the furniture-part damping movement.

The damping housing can be movable relative to the support during a furniture-part damping movement and/or during an adjustment movement.

According to a first embodiment, the damper housing can be swivelable and translationally movable relative to the support.

Alternatively, the damper housing can be displaceable, preferably linearly, relative to the support.

To alter the damping force, the damping stroke or the damping start position, the relative position between the damper housing and the support can be adjusted with the adjustment device.

It is possible for the adjustment to be effected continuously via the adjustment device. Alternatively (and particularly preferably), the relative position between the damper housing and the support can be adjusted with the adjustment device by switching a toollessly actuatable switch between two positions.

In a preferred embodiment, the actuating arm device is movable between a first maximum position, which corresponds to the closed position between movable furniture part and furniture carcass, and a second maximum position, which corresponds to the maximum open position of the movable furniture part relative to the furniture carcass.

In principle, it is possible for the damping device to damp the entire movement stroke of the actuating arm device. However, preferably the damping is effected via the damping device in a movement portion of the movable furniture part upstream of the closed position and the maximum open position.

Specifically, the (in each case) upstream movement portion corresponds to a pivot angle range of the actuating arm device (and thus indirectly of the movable furniture part) of between 2° and 25°, preferably between 5° and 15°.

As known per se, the actuating arm device has a transfer mechanism for transferring a force of the energy storage mechanism to an actuating arm of the actuating arm device.

Particularly preferably, the transfer mechanism has a control cam and a pressure roller loaded by the energy storage mechanism, wherein the pressure roller can be moved along the control cam during a movement of the at least one actuating arm.

Furthermore, preferably the actuating arm device has at least one damping transmission element (preferably two separate damping transmission elements), which can be moved with the actuating arm device and rests via a limit stop against the damping device, preferably against its damper piston, during a furniture-part damping movement.

Specifically, there are two preferred variants which can be implemented in one drive device, in particular in order to make it possible to impinge on the damping device from the same side.

Accordingly, a first damping transmission element is arranged or formed on the actuating arm, wherein via this first damping transmission element the opening movement of the actuating arm device can be damped, preferably in a movement portion of the movable furniture part upstream of the maximum open position.

Furthermore, a second damping transmission element is mounted movably, preferably rotatably, on the support and is movement-coupled to the transfer mechanism at least in portions, wherein via this second damping transmission element the closing movement of the actuating arm device can be damped, preferably in a movement portion of the movable furniture part upstream of the closed position.

For a compact design, the energy storage mechanism is arranged between the support and the actuating arm device and is active between the support and the actuating arm device.

According to a preferred embodiment, the drive device has an ejection device for ejecting the movable furniture part from the closed position into an open position.

It is particularly preferable that the ejection device has a locking device which can be released by pressing the movable furniture part into an overpressed position lying behind the closed position.

The energy storage mechanism can be formed, for example, as a gas spring. Preferably, the energy storage mechanism is formed as a spring, preferably as a compression spring. The energy storage mechanism can also be formed as a spring assembly.

Protection is also sought for a piece of furniture with a furniture carcass, a furniture part mounted movably on the furniture carcass, preferably in the form of a furniture flap, and a drive device according to the invention.

According to a preferred embodiment, on two opposite side walls of the furniture carcass, a drive device is arranged in each case, which can drive the same movable furniture part via their respective actuating arm devices.

BRIEF DESCRIPTION OF THE DRAWINGS

Further details and advantages of the present invention are explained in more detail below by means of the description of the figures with reference to the embodiments represented in the drawings, in which.

DETAILED DESCRIPTION OF THE INVENTION

Figure 1:
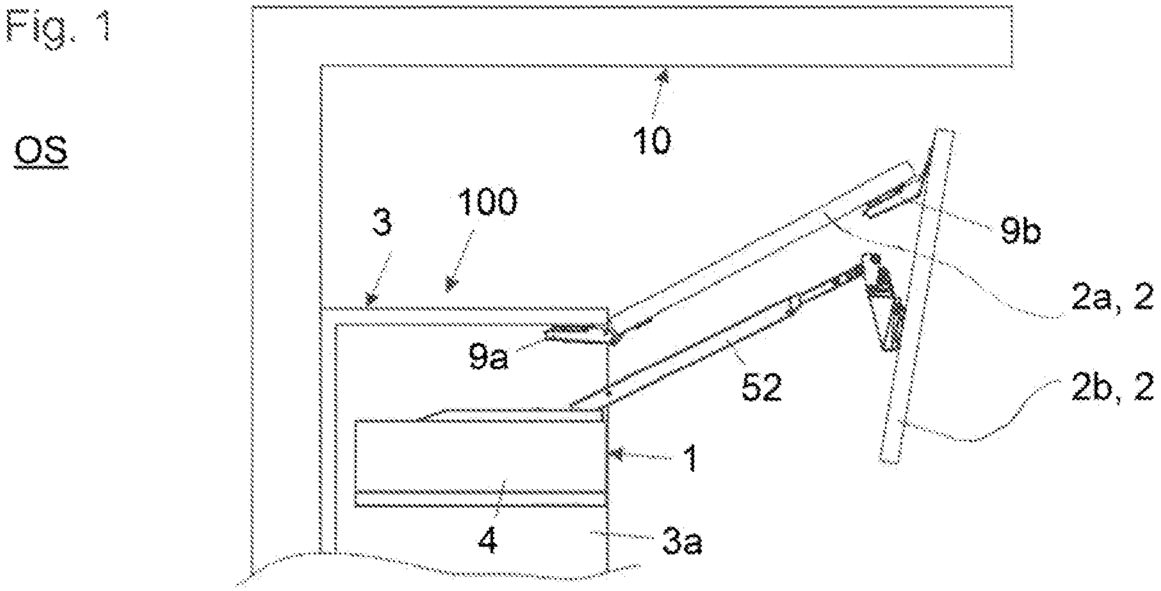
FIG. 1 is a schematic view of a piece of furniture with a drive device for a furniture flap.

FIG. 1 shows a piece of furniture 100 with a furniture carcass 3, wherein a drive device 1 (furniture fitting) for moving a movably mounted furniture part 2 is fastened to a side wall 3*a* of the furniture carcass 3.

In the embodiment shown the movable furniture part 2 has two furniture flaps 2*a*, 2*b*, wherein a first furniture flap 2*a* is connected to the furniture carcass 3 swivelable about a horizontally running axis of rotation via at least two hinges 9*a*, and the second furniture flap 2*b* is connected to the first furniture flap 2*a* swivelable about a horizontally running axis of rotation via at least two hinges 9*b*.

The drive device 1 has a support 4 to be fastened to the furniture carcass 3, preferably to the side wall 3*a* of the furniture carcass 3, and at least one actuating arm 52, swivelable relative to the support 4, which is connected to the movable furniture part 2, preferably to the second furniture flap 2*b*.

It can be seen that the piece of furniture 100 in FIG. 1 is arranged spaced apart from the ceiling 10. In FIG. 1 the actuating arm 52 occupies a relatively large swivel angle, which corresponds to the maximum open position OS of the movable furniture part 2.

Figure 2A:
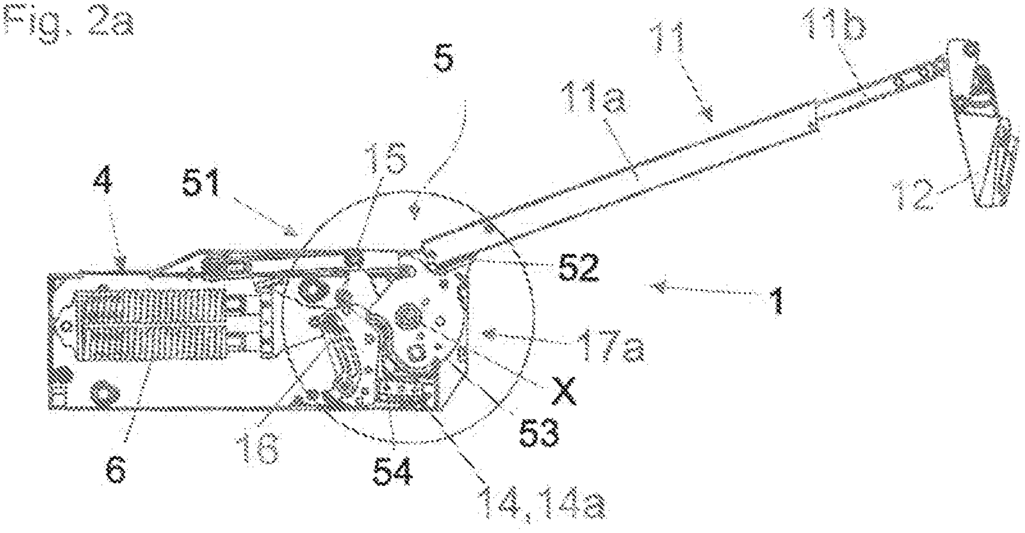
FIG. 2*a* is a view of a drive device with an actuating arm device and an energy storage mechanism.

FIG. 2*a* shows the drive device 1 in a side view, wherein the drive device 1 has a support 4 to be fastened to the furniture carcass 3 and at least one actuating arm 52, which is mounted on the support 4 swivelable about an axis of rotation X.

In the embodiment shown, an actuating arm extension 11 is detachably arranged on the actuating arm 52, wherein the actuating arm extension 11 has two actuating arm parts 11*a*, 11*b* displaceable relative to each other. Preferably, the actuating arm parts 11*a*, 11*b* are telescopically displaceable relative to each other, wherein the first actuating arm part 1*la* is detachably connectable to the actuating arm 52. The second actuating arm part 11*b* has a fastening device 12, detachably connectable, preferably toollessly lockable and releasable, to a fitting part to be fastened to the movable furniture part 2.

To apply force to the actuating arm 52 of the actuating arm device 5, an energy storage mechanism 6 is provided, which can have for example at least one coil spring, preferably at least one compression spring. Alternatively, the energy storage mechanism 6 can also have other energy storage mechanisms, such as for example a fluid store in the form of a gas spring.

The actuating arm device 5 has a transfer mechanism 51 for transferring a force of the energy storage mechanism 6 to the at least one actuating arm 52. Preferably, the transfer mechanism 51 has a control cam 53 and a pressure roller 54 loaded by the energy storage mechanism 6, wherein the pressure roller 54 can be moved along the control cam 53 during a movement of the at least one actuating arm 52.

The control cam 53 can be arranged or formed on the actuating arm 52 according to a preferred embodiment. Of course, it is also possible to arrange the control cam 53 in another location in the transfer mechanism 51 of the actuating arm device 5.

Through a force adjustment device 14, a force of the energy storage mechanism 6 can be adjusted to the at least one actuating arm 52. Preferably:

- the force adjustment device 14 has at least one rotatably mounted adjustment wheel 14*a*, wherein a force of the energy storage mechanism 6, acting on the at least one actuating arm 52, can be adjusted to the actuating arm 52 by rotating the adjustment wheel 14*a*, and/or
- the force adjustment device 14 has at least one threaded spindle 16, along which a point of application 15 of the energy storage mechanism 6 is movable when the force adjustment device 14 is actuated, and/or
- the support 4 has a front face with at least one opening 17*a*, through which the at least one actuating arm 52 protrudes in an open position, wherein an adjustment wheel 14*a* of the force adjustment device 14 is actuatable through the opening 17*a* from a direction transverse to the front face.

Figure 2B:
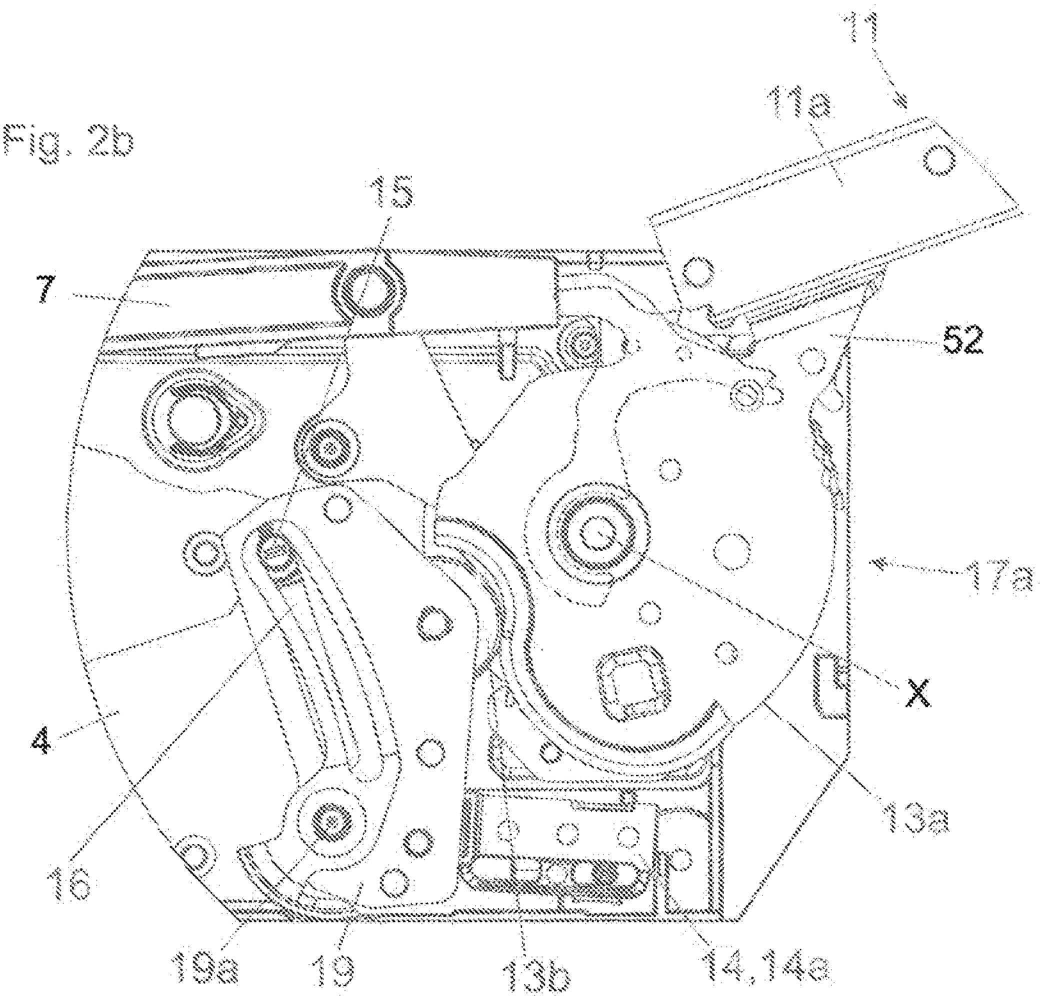
FIG. 2*b* is a detail from FIG. 2*a*, FIGS. 3*a*+3*b* are perspective representations of the drive device, FIGS. 4*a*+4*b* are longitudinal sections through the drive device in a central open position, FIGS. 5*a*+5*b* are details for FIGS. 4*a* and 4*b*, FIGS. 6*a*+6*b* are longitudinal sections through the drive device in a furniture part position upstream of the maximum open position, wherein in each case the damping start position is given, FIGS. 7*a*+7*b* are longitudinal sections through the drive device in a furniture part position upstream of the closed position, wherein in each case the damping start position is given, FIGS. 8*a*+8*b* are different views of a longitudinal section through the damping device, FIGS. 9*a*+9*b* are perspective views of a second embodiment of the adjustment device, including details, FIGS. 10*a*+10*b* are perspective views of a third embodiment of the adjustment device

FIG. 2*b* shows the region encircled in FIG. 2*a* in an enlarged view. The transfer mechanism 51 has an intermediate lever 19, which is mounted on the support 4 swivelable about an axis of rotation 19*a*. The threaded spindle 16 is mounted on the intermediate lever 19. By rotating the adjustment wheel 14*a* of the force adjustment device 14 by means of a tool, the threaded spindle 16 is rotatable, whereby the point of application 15 of the energy storage mechanism 6 moves along the threaded spindle 16. In this way, the relative distance between the point of application 15 and the axis of rotation 19*a* of the intermediate lever 19 and thus the torque of the energy storage mechanism 6 acting on the actuating arm 52 can be made larger and smaller.

The drive device 1 furthermore comprises at least one damping device 7 for damping a movement of the at least one actuating arm 52 of the actuating arm device 5. Preferably the damping device 7:

- is formed as a fluid damper, and/or
- has at least one piston-cylinder unit, and/or
- can be impinged on by the at least one actuating arm 52 during a closing movement, and/or
- can be impinged on from the same side both during an opening movement O and during a closing movement S of the at least one actuating arm 52.

Figure 3A:
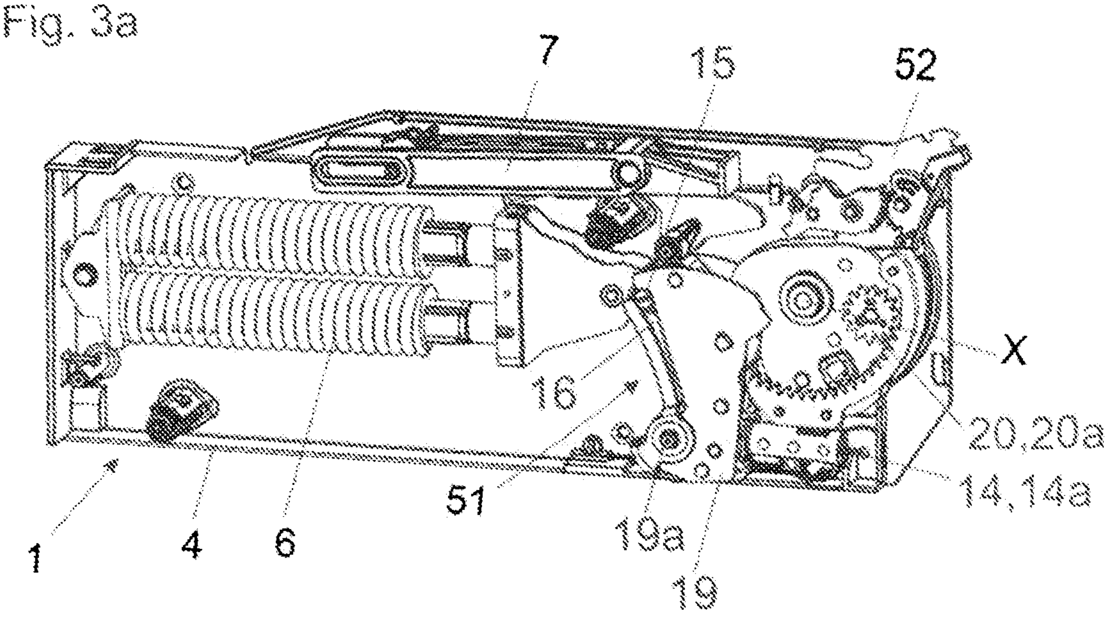

FIG. 3*a* shows the drive device 1 in a perspective view, wherein a force of the energy storage mechanism 6 can be transferred to the at least one actuating arm 52 by the transfer mechanism 51 of the actuating arm device 5. The force adjustment device 14 can comprise for example a rotatable adjustment wheel 14*a*, wherein the point of application 15 of the energy storage mechanism 6 along the threaded spindle 16 and thus the torque acting on the actuating arm 52 can be adjusted by rotating the adjustment wheel 14*a*.

In addition, the drive device 1 can have an installation-securing device 20 for the empty actuating arm 52, thus on which no movable furniture part 2 has yet been installed, for limiting an opening speed of the empty actuating arm 52, wherein the installation-securing device 20 prevents an unintentional opening or swinging-out of the empty actuating arm 52 through a force of the energy storage mechanism 6. It is preferably provided that the installation-securing device 20 comprises at least one centrifugal clutch 20*a*.

Figure 3B:
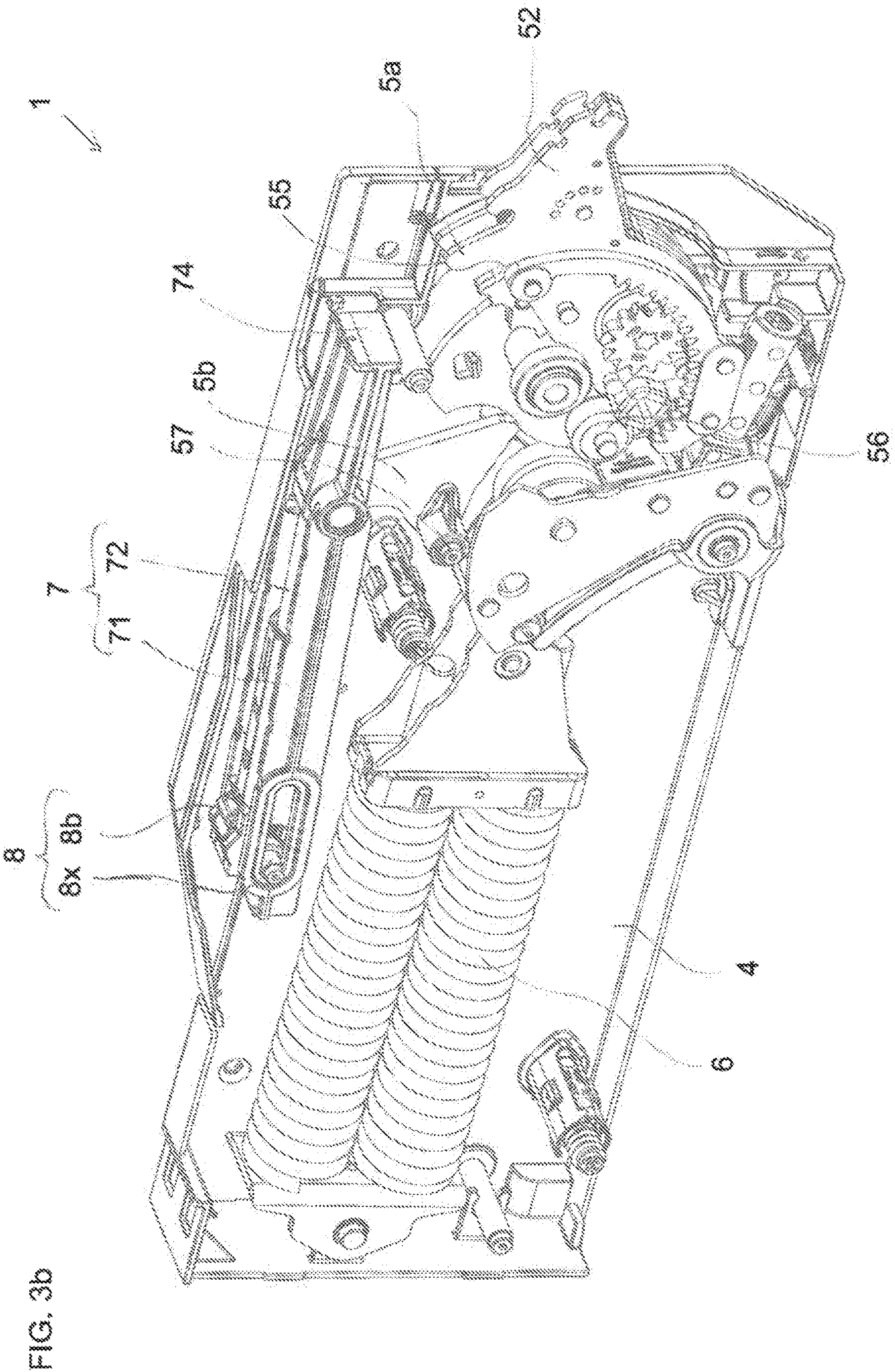

FIG. 3*b* shows the drive device 1 in a further (slightly offset) perspective view. The entire damping device 7 can easily be seen in this representation. This damping device 7 has the damper housing 71 and the damper piston 72.

The damping device 7 is adjustable relative to the support 4 via an adjustment device 8. The adjustment device 8 has an adjustment element 8*a* (in the form of a switch) and the adjustment axle pin 8*x*. The adjustment axle pin 8*x* is fixedly connected to the support 4.

In FIG. 3*b* the adjustment element 8*a* is pivoted to the right, whereby the damping device 7 is in a maximum position to the right relative to the support 4.

It can be seen in FIG. 3*b* that a first damping transmission element 5*a* is formed on the actuating arm 52. This first damping transmission element 5*a* is an extension which faces towards the damping device 7. In the position represented in FIG. 3*b*, the limit stop 55 is (still) spaced apart from the limit stop counterpart 74 formed on the damper housing 71.

A limit stop element 56 (in the form of a roller) is arranged on the actuating arm device 5. This limit stop element 56 is (still) spaced apart from the second damping transmission element 5*b*, which is mounted pivotably on the support 4 via the axle pin 57.

FIGS. 4*a* to 7*b* show in each case a vertical longitudinal section through the drive device in different positions.

Figure 4A:
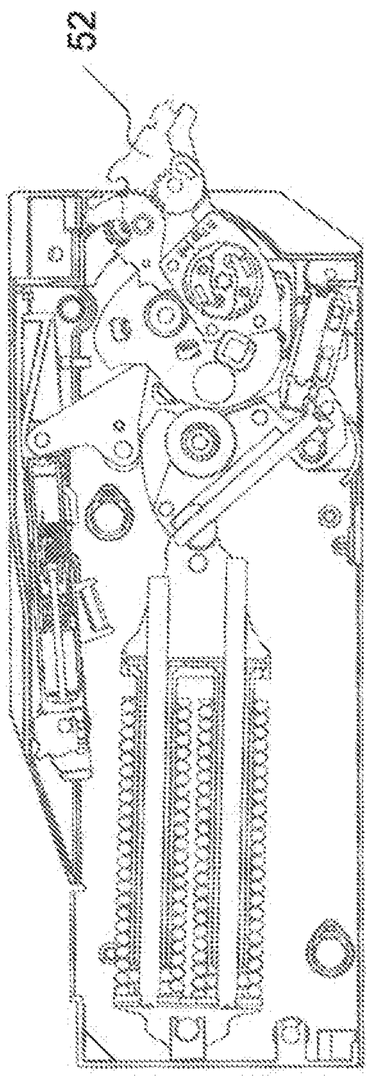
Figure 4B:
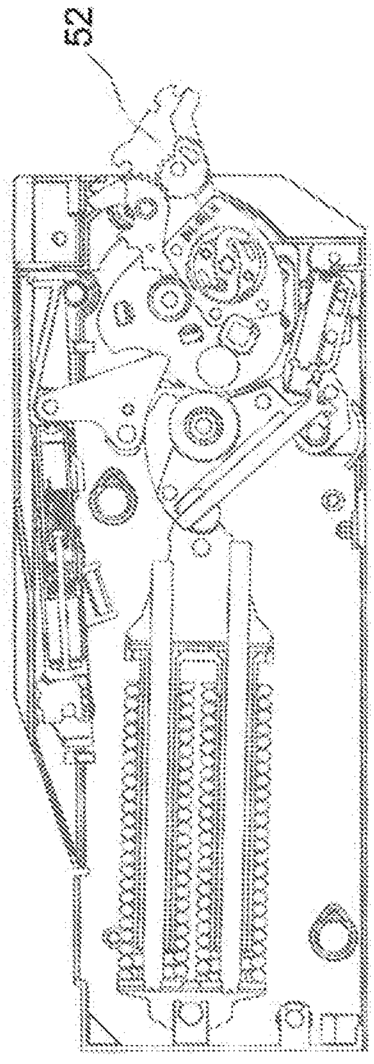

In FIGS. 4*a* and 4*b* the actuating arm device 5 is in the same open position. This corresponds to a movable furniture part 2 approximately half open. The opening angle of the actuating arm 52 lies somewhere in the range between 55° and 80°.

However, FIGS. 4*a* and 4*b* differ to the effect that the damping device 7 is in different positions. In FIG. 4*b* the damping device 7 is in its maximum position to the right. As can be seen in the associated enlarged representation according to FIG. 5*b*, the adjustment element 8*a* is rotated to the right about the adjustment axle pin 8*x*. As a result, there is a relatively wide range for adjustment of the adjustment element 8*a* between the damper housing 71 and the adjustment axle pin 8*x* (which is fixedly connected to the support 4).

Figure 5A:
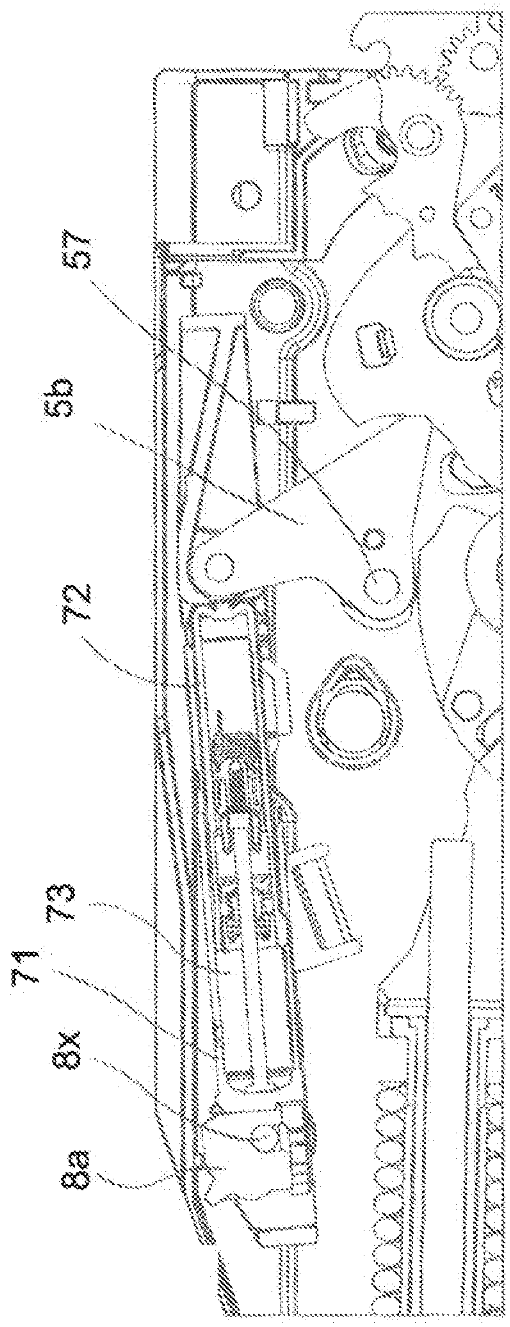

In contrast, in FIG. 4*a* and in the associated FIG. 5*a*, the adjustment element 8*a* of the adjustment device is rotated to the left by 90°. As a result, there is a relatively narrow range of the adjustment element 8*a* between the damper housing 71 and the adjustment axle pin 8*x*. The damping device 7 is in its maximum position to the left.

In all positions according to FIGS. 4*a* to 5*b* the damping device is unloaded and thus stress-relieved and in the fully extended position. The second pressure transmission element 5*b* rests against the damping piston 72.

Figure 5B:
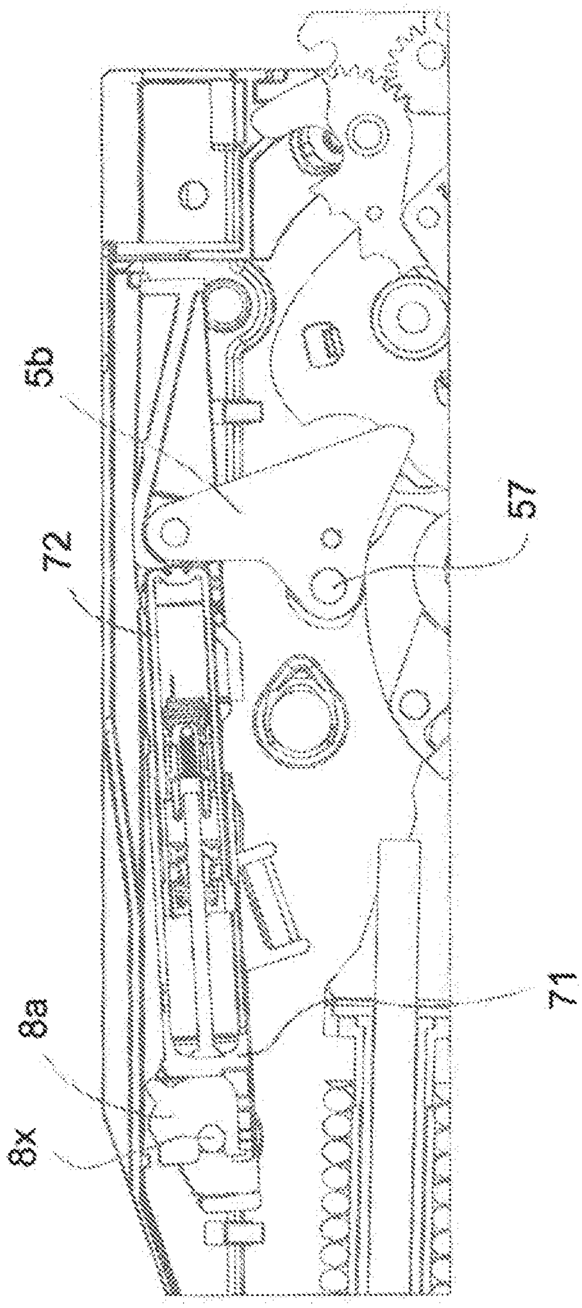

By comparing FIGS. 5*a* and 5*b* it can be seen that the damper housing 71 has also performed a (slight) swivel movement relative to the support 4 in addition to a translational displacement movement relative to the support 4.

Figure 6A:
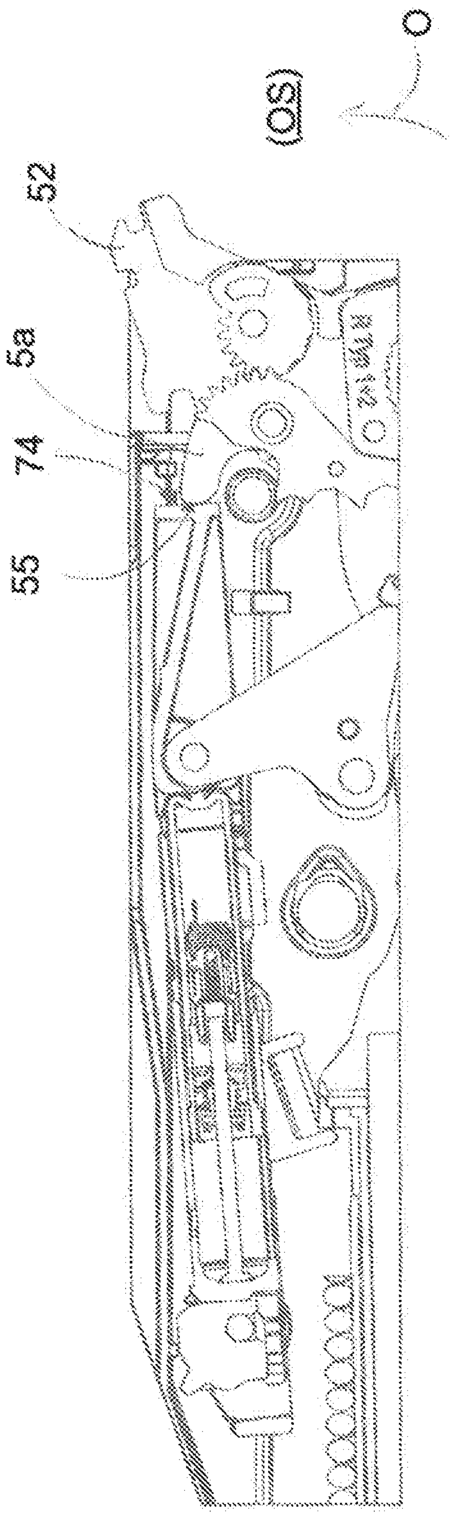
Figure 6B:
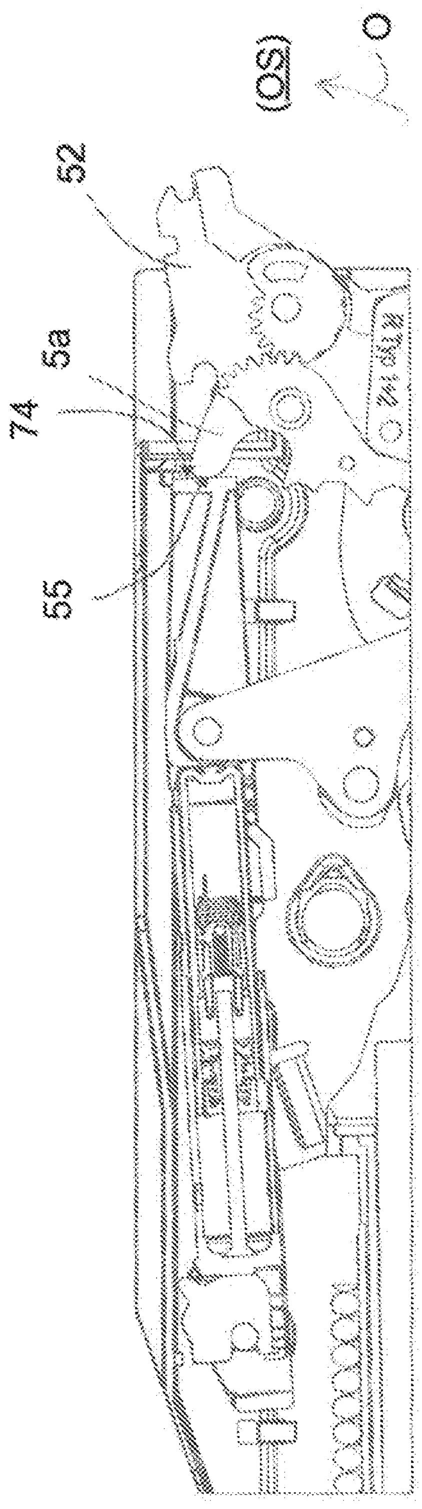

In FIGS. 6*a* and 6*b* an opening movement O of the actuating arm device 5 has been performed—starting from the earlier FIGS. 4*a* to 5*b*. The actuating arm 52 has thereby been swiveled upwards. This opening movement O was performed until the limit stop 55 of the first damping transmission element 5*a* contacts the limit stop counterpart 74. The damping start position D is reached in this position in each case.

As the damping devices 7 in FIGS. 6*a* and 6*b* are in different maximum positions, the actuating arm 52 occupies a different angle position in the case of the damping start position D given in each case. Specifically, an opening angle of approximately 108° is given in FIG. 6*a*, while an opening angle of 100° is given in FIG. 6*b*.

If the opening movement O is continued from this respective damping start position D, the damper piston 72 is pushed into the damper housing 71 via the limit stop counterpart 74, whereby the damping effect of the damping device 7 occurs. As soon as the damper piston 72 has retracted entirely, the maximum open position OS is reached (not represented).

The movement portion of the movable furniture part 2 upstream (i.e., before with respect to the opening movement) of the maximum open position OS is thus damped, wherein the damping start position D is adjusted differently via the adjustment device 8. Different opening angles can thereby be adjusted for the start of the damping movement.

The same principle also applies to the closing movement S.

Figure 7A:
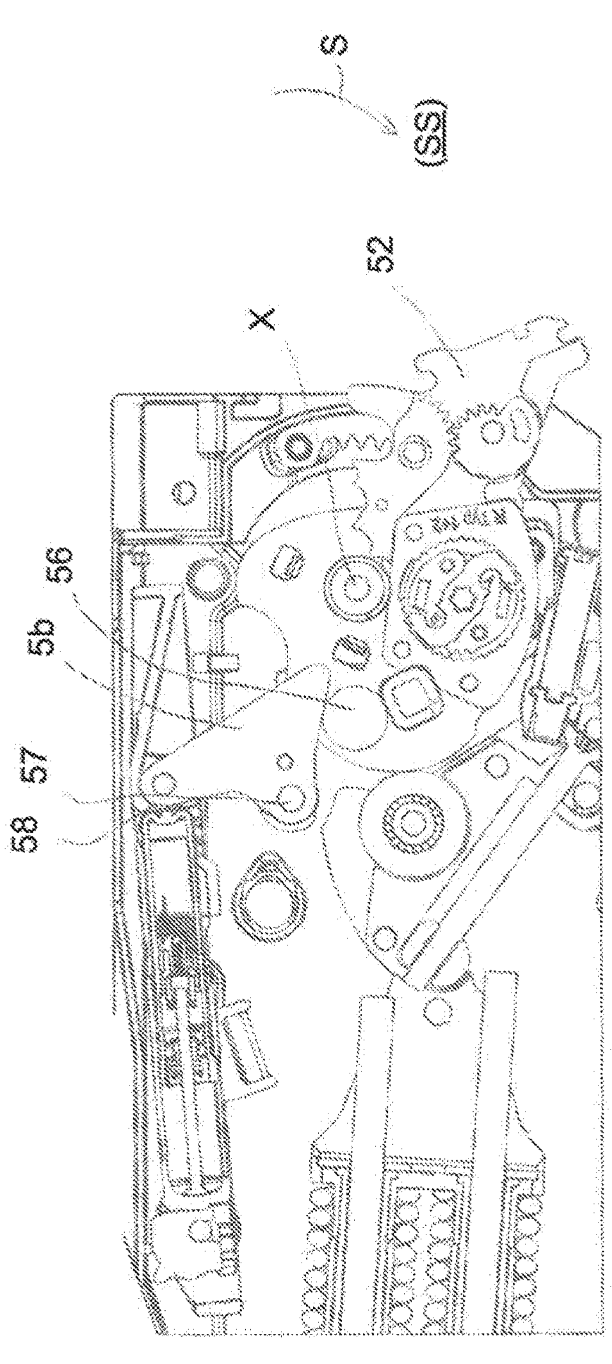
Figure 7B:
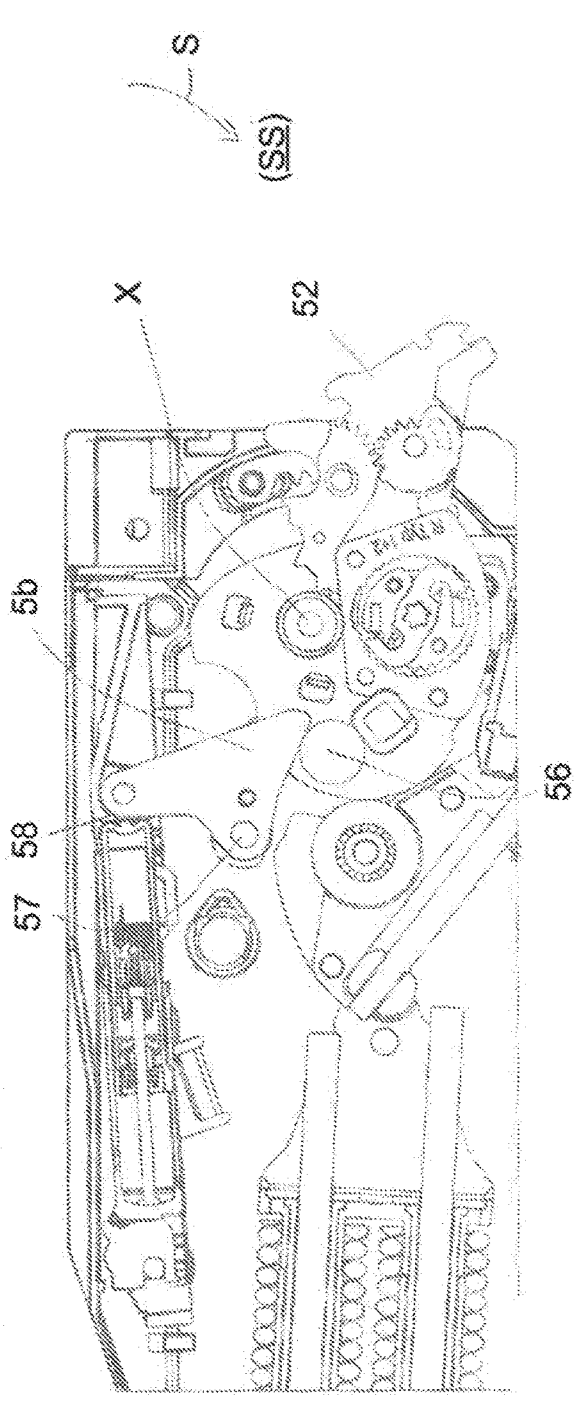

In FIGS. 7*a* and 7*b* a closing movement S of the actuating arm device 5 has been performed—starting from FIGS. 4*a* to 5*b*. The actuating arm 52 has thereby been swiveled downwards. This closing movement S was performed until the limit stop element 56 contacts the second damping transmission element 5*b* due to the rotational movement of the actuating arm 52 about the axis of rotation X. The damping start position D is reached in this position in each case.

As the damping devices 7 in FIGS. 7*a* and 7*b* are in different maximum positions, the actuating arm 52 occupies a different angle position in the case of the damping start position D given in each case. Specifically, an opening angle of approximately 22° is given in FIG. 7*a*, while an opening angle of just under 33° is given in FIG. 7*b*.

If the closing movement S is continued from this respective damping start position D, the second damping transmission element 5*b* is rotated counterclockwise about the axle pin 57 via the limit stop element 56, whereby the damping transmission element 5*b* presses on the damper piston 72 via the limit stop 58 and pushes it into the damper housing 71, whereby the damping device 7 again takes effect. As soon as the damper piston 72 has retracted entirely, the closed position SS is reached (not represented).

Figure 8A:
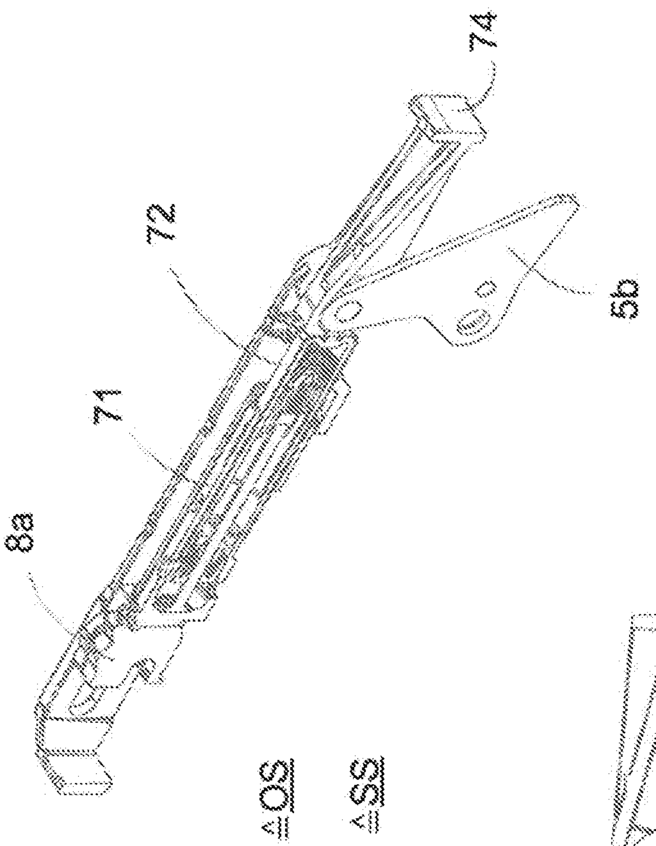
Figure 8B:
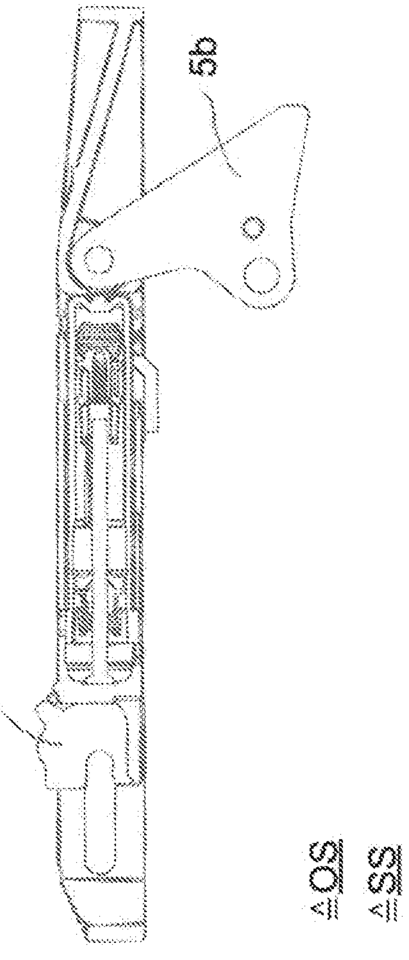

The damping device 7 is represented without the other constituents of the drive device 1 in a longitudinal section in FIGS. 8*a* and 8*b*. The damper piston 72 has retracted, whereby the damping end position is virtually reached. (The internal structure of the damping device 7 is not described in more detail as it corresponds to a fluid damper known per se.)

Figure 9A:
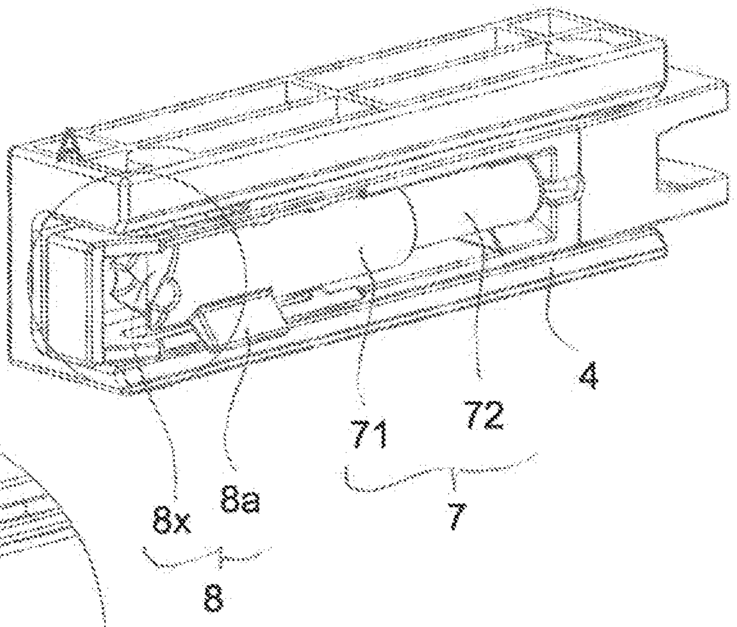
Figure 9A:
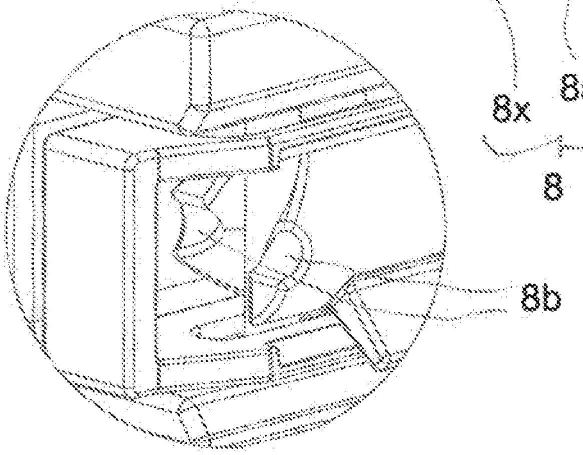
Figure 9B:
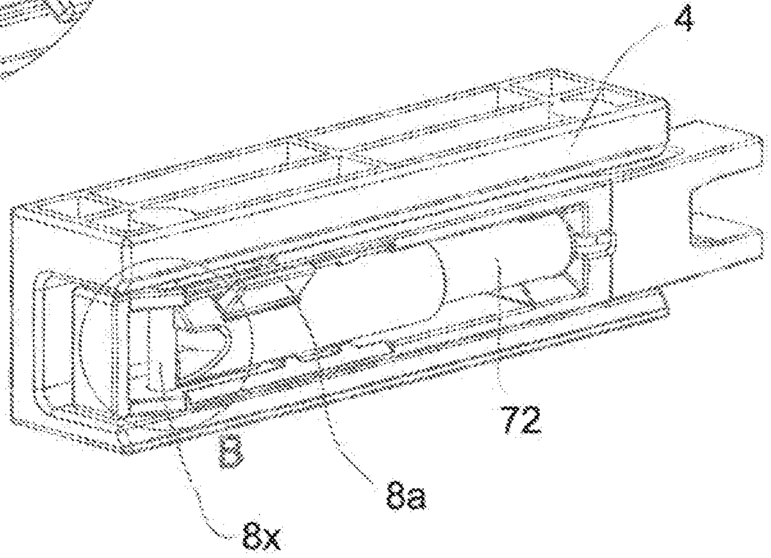
Figure 9B:
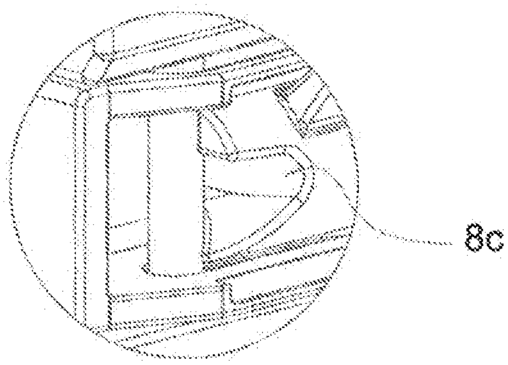

FIGS. 9*a* and 9*b* show another embodiment of an adjustment device 8. Again the damping device 7 is adjustably mounted in the support 4. The adjustment axle pin 8*x* of the adjustment device 8 is fixedly connected to the support 4. The adjustment means 8*a* is formed as a wing-like extension on the damper housing 71. On its front face the damper housing 71 has depressions 8*b* and 8*c* of different depths which are arranged transverse (preferably at right angles) to each other. In FIG. 9*a* and in the associated detail the adjustment axle pin 8*x* is located in the deeper depression 8*c*, whereby the damping device 7 is in its maximum position to the left.

In FIG. 9*b* the damper housing 71 has been rotated about the longitudinal axis by approx. 90° manually via the adjustment means 8*a*. As a result the adjustment axle pin 8*x* is now located in the less deep depression 8*b*, whereby the damping start position D is correspondingly adjusted.

Figure 10A:
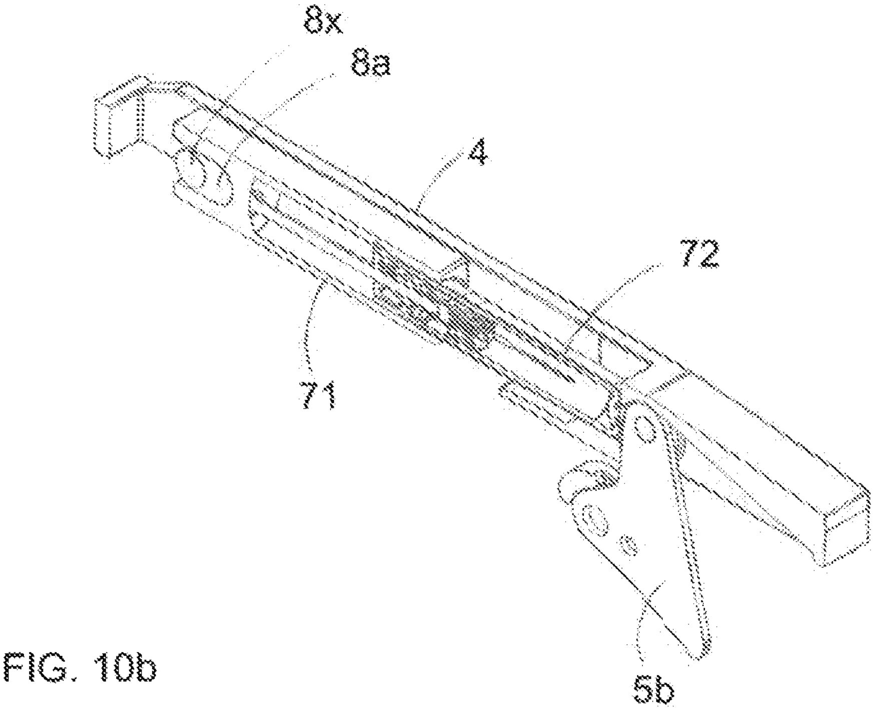

Finally, FIG. 10*a* shows a further embodiment of a damping device 7, wherein a, preferably manually insertable, spacer is used as adjustment means 8*a*. The maximum position to the right is thereby reached in FIG. 10*a*.

Figure 10B:
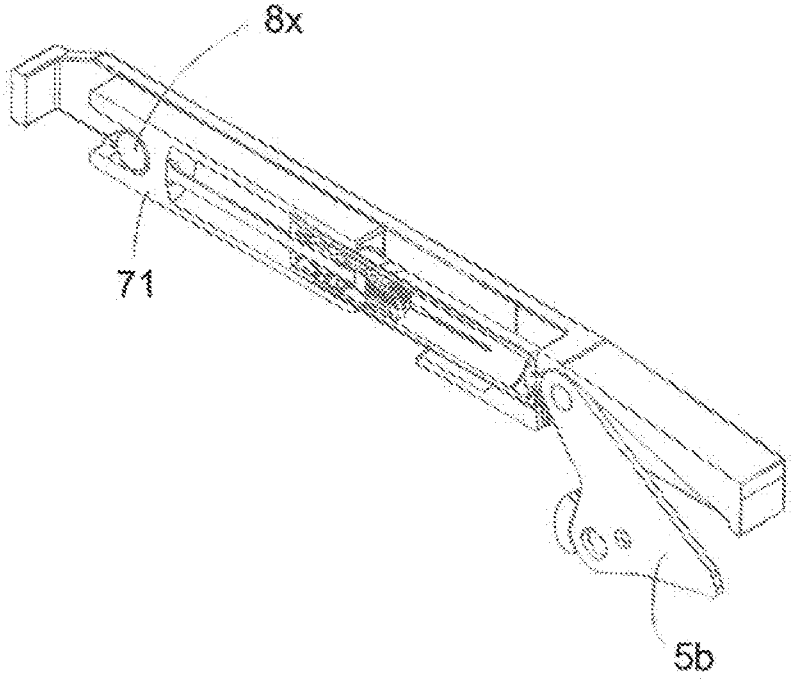

In FIG. 10*b* this adjustment means 8*a* of the adjustment device 8 has been removed, whereby the adjustment axle pin 8*x* has moved further in the direction of the damper housing 71 and the maximum position to the left is given, which again corresponds to a damping start position in the case of another opening angle.

Figure 11A:
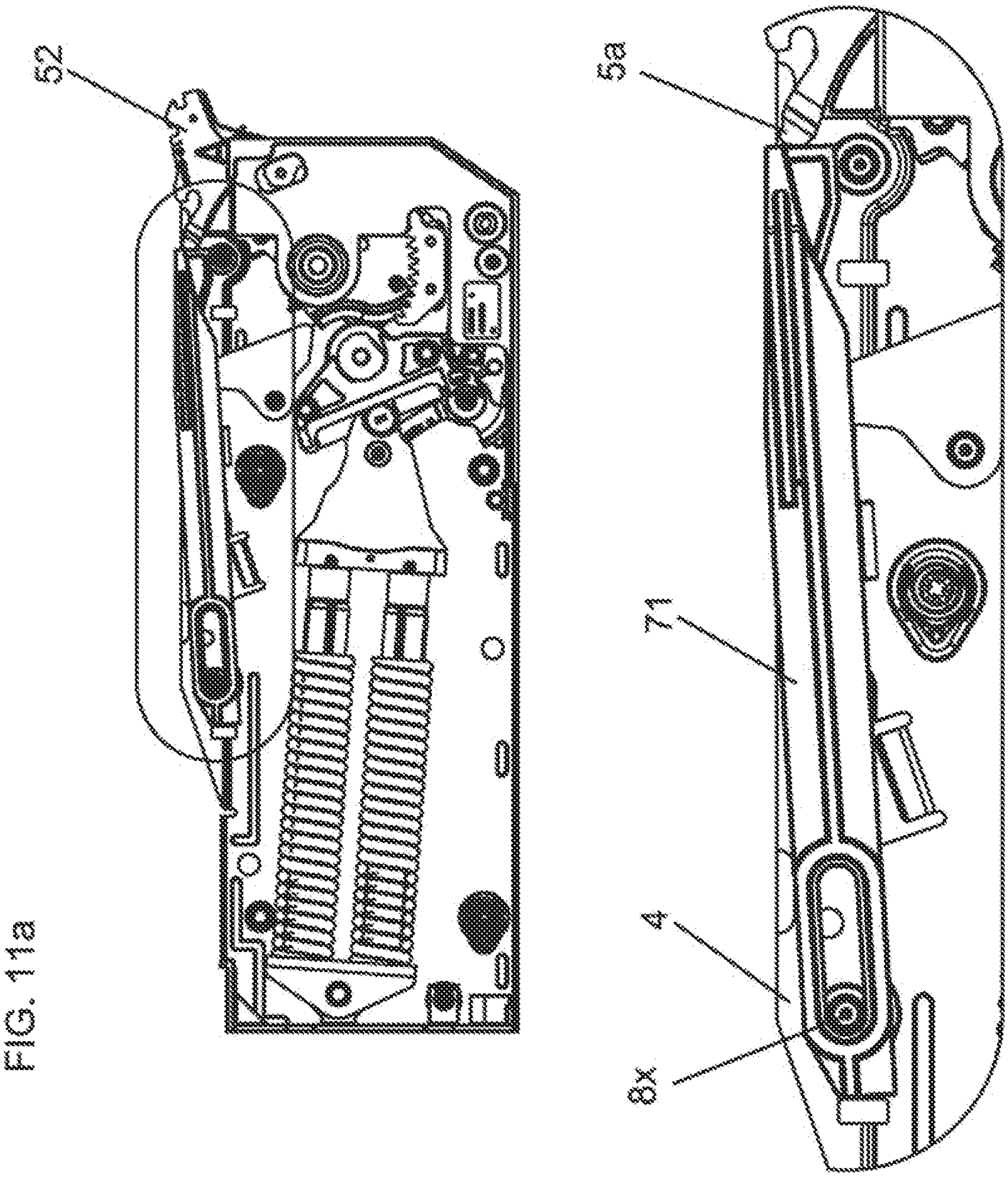
FIGS. 11*a*-11*c* are various representations of an embodiment with a linearly displaceable damper housing.
Figure 11B:
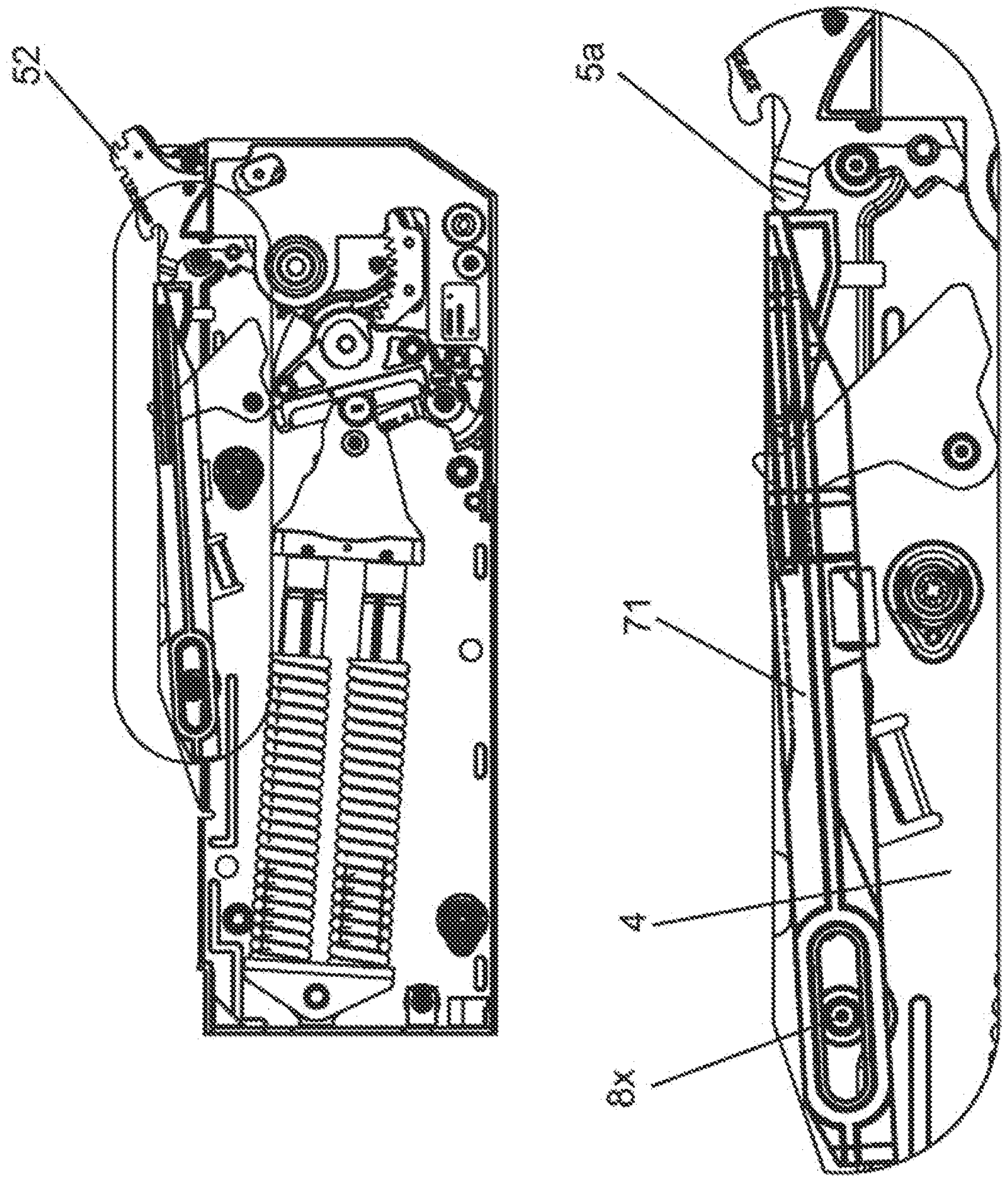
Figure 11C:
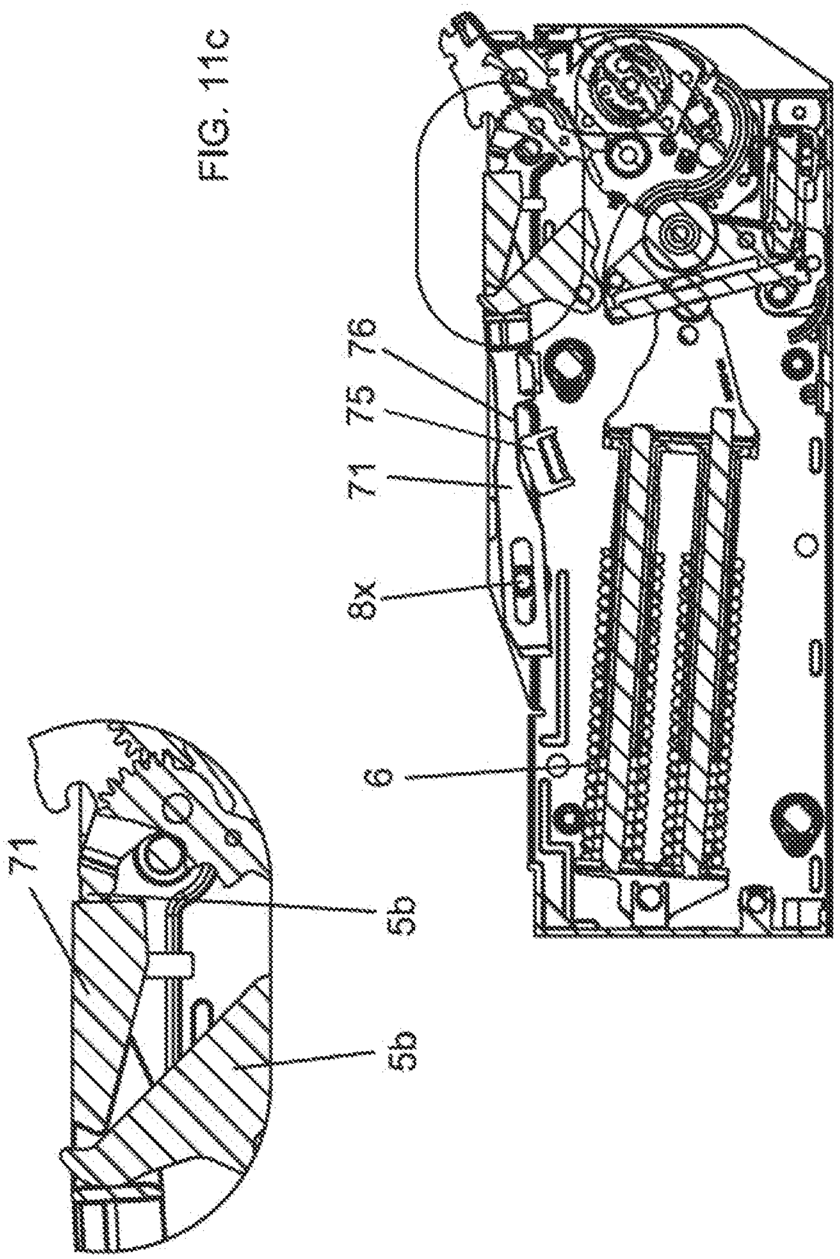

A further embodiment is represented in FIGS. 11*a* to 11*c*. The basic mode of operation is the same as in the case of the previously described embodiments, which is why the description of most components is not repeated again.

This embodiment according to FIGS. 11*a* to 11*c* differs to the effect that the damper housing 71 is mounted on the support 4 only linearly displaceably.

In FIG. 11*a* the actuating arm 52 has approximately the same position as in FIG. 6*b*. In FIG. 11*b* the position of the actuating arm 52 approximately corresponds to that of FIG. 6*a*. The damper housing 71 in FIGS. 11*a* and 11*b* is in different positions relative to the support 4 (and the adjustment axle pin 8*x* arranged on the support 4) via the adjustment device 8, whereby different damping start positions D are given.

The drive device 1 is represented cut along a longitudinal plane in FIG. 11*c*, whereby details of the damper housing 71 can be seen. Specifically, a guide surface 76, via which the damper housing 71 rests against the guide element 75 arranged on the support 4, is formed on the damper housing 71. The damper housing 71 can slide linearly along the guide element 75 over the guide surface 76.

In the detail at the top left, the first damping transmission element 5*a* and the second damping transmission element 5*b* can still be seen, which in each case rest against the damper housing 71.

LIST OF REFERENCE NUMBERS

1 drive device
2 movable furniture part
2*a* first furniture flap
2*b* second furniture flap
3 furniture carcass
3*a* side wall
4 support
5 actuating arm device
5*a* first damping transmission element
5*b* second damping transmission element
51 transfer mechanism

52 actuating arm
53 control cam
54 pressure roller
55 limit stop
56 limit stop element
57 axle pin
6 energy storage mechanism
7 damping device
71 damper housing
72 damper piston
73 damping agent
74 limit stop counterpart
75 guide element
76 guide surface
8 adjustment device
8*a* adjustment means
8*x* adjustment axle pin
8*b*, 8*c* depressions
9*a* hinges
9*b* hinges
10 ceiling
11 actuating arm extension
11*a* first actuating arm part
11*b* second actuating arm part
12 fastening device
14 force adjustment device
14*a* adjustment wheel
15 point of application
16 threaded spindle
17*a* opening
19 intermediate lever
19*a* axis of rotation
20 installation-securing device
20*a* centrifugal clutch
100 piece of furniture
D damping start position
S closing movement
O opening movement
SS closed position
OS maximum open position
X axis of rotation

The invention claimed is:

1. A drive device for a movable furniture part, comprising:

a support to be fastened to a furniture carcass, an actuating arm device mounted movably on the support and to be connected to the movable furniture part, an energy storage mechanism configured to apply a force to the actuating arm device, a damping device having a damper housing and being configured to dampen a closing movement and an opening movement of the actuating arm device, and an adjustment device configured to adjust a relative position between the damper housing and the support such that the damping device is adjustable in terms of a damping start position in relation to an angle position of the actuating arm device relative to the support, wherein the adjustment device comprises an adjustment element coupled to the damping device such that an adjustment of the damping force, of the damping start position, and/or of the damping stroke carried out by the adjustment device can be performed on the damping device both when damping the actuating arm device during the closing movement and when damping the actuating arm device during the opening movement.

2. The drive device according to claim 1, wherein the damping device is configured to be impinged on by the actuating arm device from the same side both during the opening movement and during the closing movement.

3. The drive device according to claim 1, wherein the damping device has a damper piston movable relative to the damper housing, and has a damping agent.

4. The drive device according to claim 3, wherein the actuating arm device rests against the damper piston during a damping movement.

5. The drive device according to claim 4, wherein the damper housing is stationary relative to the support during a damping movement.

6. The drive device according to claim 3, wherein a relative position between the damper housing and the support is adjustable by switching the adjustment element of the adjustment device between two positions, the adjustment element being a toollessly actuatable adjustment element in the form of a switch.

7. The drive device according to claim 3, wherein the damping agent is a damping fluid arranged in a fluid chamber of the damper housing to dampen a relative movement between the damper housing and the damper piston.

8. The drive device according to claim 1, wherein the actuating arm device is movable between a first maximum position, corresponding to a closed position between movable furniture part and furniture carcass, and a second maximum position, corresponding to a maximum open position of the movable furniture part relative to the furniture carcass.

9. The drive device according to claim 8, wherein the damping is effected via the damping device in a damping movement portion of the movable furniture part before reaching the closed position when the movable furniture part is moving in a closing direction and before reaching the maximum open position when the movable furniture part is moving in an opening direction.

10. The drive device according to claim 9, wherein the damping movement portion corresponds to a pivot angle range of between 2° and 25°.

11. The drive device according to claim 9, wherein the damping movement portion corresponds to a pivot angle range of between 5° and 15°.

12. The drive device according to claim 1, wherein the actuating arm device has a transfer mechanism for transferring a force of the energy storage mechanism to an actuating arm of the actuating arm device.

13. The drive device according to claim 12, wherein the transfer mechanism has a control cam and a pressure roller loaded by the energy storage mechanism, wherein the pressure roller is movable along the control cam during a movement of the actuating arm.

14. The drive device according to claim 1, wherein the actuating arm device has a damping transmission element movable with the actuating arm device and resting via a limit stop against the damping device during a damping movement.

15. The drive device according to claim 14, wherein the damping transmission element is formed on the actuating arm and is configured to dampen the opening movement of the actuating arm device.

16. The drive device according to claim 15, wherein the damping transmission element is configured to dampen the opening movement of the actuating arm device in a damping portion of the movable furniture part while traveling in an opening direction before reaching the maximum open position.

17. The drive device according to claim 14, wherein the damping transmission element is a first damping transmission element, the actuating arm device further having a second damping transmission element mounted rotatably on the support and being at least partially movement-coupled to the transfer mechanism, the second damping transmission element being configured to dampen the closing movement of the actuating arm device.

18. The drive device according to claim 14, wherein the damping transmission element is a first damping transmission element, further comprising a second damping transmission element, and each of the first damping transmission element and the second damping transmission element is movable with the actuating arm device and rests via a limit stop against a damper piston of the damping device during the damping movement.

19. The drive device according to claim 1, wherein the energy storage mechanism is arranged between the support and the actuating arm device and is active between the support and the actuating arm device.

20. A piece of furniture comprising:

a furniture carcass, a furniture part mounted movably on the furniture carcass, and a drive device according to claim 1.

* * * * *